United States Patent Office 2,780,633
Patented Feb. 5, 1957

2,780,633

METHOD OF MAKING BENZOXAZOLE COMPOUNDS

Joseph Sam, Syracuse, N. Y., assignor to McNeil Laboratories, Incorporated, Philadelphia, Pa., a corporation of Pennsylvania No Drawing. Application August 11, 1955, Serial No. 527,883

10 Claims. (Cl. 260—307)

The present invention relates to a novel method for the preparation of a benzoxazole compound possessing valuable therapeutic properties; and, more particularly to a novel method for preparing 2-amino-5-chlorobenzoxazole.

The present application is a continuation-in-part of application Serial No. 494,824, filed March 16, 1955, which latter application is a continuation-in-part of application Serial No. 453,125, filed August 30, 1954.

In copending application Serial No. 543,579, filed October 28, 1955, are disclosed and claimed novel medical compositions comprising 2-amino-5-chlorobenzoxazole or a salt thereof. These compositions have been found to be outstanding in their ability to produce relaxation of the skeletal muscles by a mechanism involving the depression of the polysynaptic pathways of the central nervous system, and thus in their ability to relieve spasticity in animals and man. These compositions are highly active and provide an effect of prolonged duration. With these compositions there is a wide safety margin between the effective dose and the lethal dose, and administration is not accompanied by deleterious side effects, including initial excitement, salivation, nausea or vomiting.

It is the principal object of the present invention to provide a novel method for the preparation of 2-amino-5-chlorobenzoxazole.

It is another object of the present invention to provide a novel method for preparing 2-amino-5-chlorobenzoxazole in satisfactory yields and without undesirable health hazards and other disadvantages which are found with other possible methods for preparing this compound.

Other objects will become apparent from a consideration of the following specification and the claims.

The method for preparing 2-amino-5-chlorobenzoxazole in accordance with the present invention comprises removing hydrogen sulfide from 5-chloro-2-hydroxyphenylthiourea. The reaction may be illustrated by the general equation:

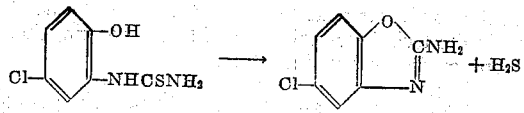

As will appear hereinafter, the removal of hydrogen sulfide and hence the reaction is facilitated by maintaining the medium on the alkaline side of neutrality and/or by including in the reaction medium a metal compound forming a sulfide insoluble in the reaction medium.

It has been found that the removal of hydrogen sulfide from 5-chloro-2-hydroxyphenylthiourea results in the completion of the benzoxazole ring to provide 5-chloro-2-aminobenzoxazole.

This can be done simply by heating the 5-chloro-2-hydroxyphenylthiourea.

This reaction preferably takes place in a liquid medium in which the thiourea is at least somewhat soluble, such as hot water. The temperature of heating will depend in part upon the nature of the liquid medium, and the temperature may go as high as 100° C., in the case of water, or even higher in the case of other, higher boiling liquids. In this embodiment the thiourea compound is heated generally to at least about 50° C.

A specific example of preparing the 2-amino-5-chlorobenzoxazole by simply heating a 5-chloro-2-hydroxyphenylthiourea is as follows:

Example I

A solution of 2-hydroxy-5-chlorophenylthiourea in hot water is boiled for 6 hours, and then cooled. The resulting precipitate is collected by filtration and extracted with dilute hydrochloric acid. Neutralization of the hydrochloric acid extract with ammonium hydroxide results in precipitation of a solid. This solid is recovered and purified by crystallization from a mixture of acetone and benzene. The resulting product, 2-amino-5-chlorobenzoxazole, has a melting point of 185–186° C. An ultraviolet spectrum of a solution of 2 milligrams of the product in 100 milliliters of methanol shows peaks at 244 and 285 mu.

The removal of the hydrogen sulfide is facilitated by maintaining the medium on the alkaline side of neutrality during the heating operation as by including in the medium a base soluble therein. Any base may be used for this purpose including the alkali metal hydroxides, the alkaline earth metal hydroxides, basic salts of alkali metals and of alkaline earth metals, ammonia, and the like.

A specific example illustrating the preparation of 2-amino-5-chlorobenzoxazole by the removal of hydrogen sulfide from the thiourea in alkaline medium is set forth below.

Example II

A suspension of 2-hydroxy-5-chlorophenylthiourea is prepared in water. One equivalent of sodium hydroxide, in aqueous solution, is added to the suspension. The resulting solution is heated at the boiling point for three hours, and then cooled. The precipitate is filtered from the mixture, and purified by crystallization from a mixture of acetone and benzene. The crystalline product, 2-amino-5-chlorobenzoxazole, has a melting point of 185–186° C. An ultraviolet spectrum of a solution of 2 milligrams of the product in 100 milliliters of methanol shows peaks at 244 and 285 mu. The calculated nitrogen content for 2-amino-5-chlorobenzoxazole is 16.6, that found in the product is 16.8.

The removal of hydrogen sulfide from the 2-hydroxy-5-chlorophenylthiourea is also facilitated by including in the reaction medium a metal compound forming a sulfide insoluble in the medium in accordance with the following equation:

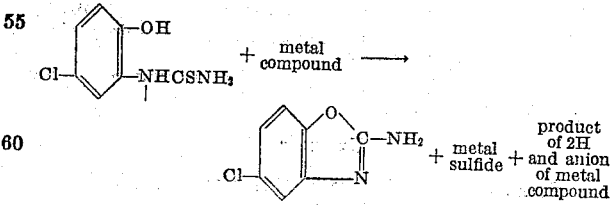

Metals which form insoluble sulfides are lead, copper, iron, nickel, cobalt, silver, mercury, uranium, tin, gold, and the like. The metal compound included in the reaction mixture may be an oxide or hydroxide or a suitable salt, such as a chloride, acetate, sulfate, or the like, of one or more of the stated metals. The compound selected should be sufficiently soluble in the reaction medium to permit formation of the corresponding sulfide. Lead compounds, particularly lead oxide, copper compounds, particularly cupric chloride, and iron compounds, particularly ferric chloride, have been found to be especially suitable.

Where a metal salt, e. g. chloride, acetate, sulfate, etc., is employed sufficient base will be added to the medium to neutralize the acid, e. g. hydrochloric, acetic, sulfuric, etc., formed during the reaction. The base employed for this purpose may be one of those mentioned hereinabove.

The amount of metal compound employed will be at least that sufficient to combine with the hydrogen sulfide liberated. Preferably some excess of the metal compound is employed and the excess may go up to as high as 50–100% in excess of that theoretically required. The amount preferably used is between 10 and about 30% in excess of that theoretically required.

In this embodiment, where the metal compound is employed with the precipitation of a metal sulfide, the preferred reaction medium is an organic solvent in which the 2-amino-5-chlorobenzoxazole is soluble and in which the metal sulfide is insoluble. Examples of suitable organic solvents which may be employed are alcohols, such as methyl alcohol, ethyl alcohol, isopropyl alcohol, and the like; ketones, such as acetone, methyl ethyl ketone, and the like; esters, such as ethyl acetate, and the like; ethers, such as dibutyl ether, and the like. The preferred solvent mediums are the alcohols, especially methyl-, ethyl- and isopropyl alcohol.

In this embodiment, the reaction temperature may vary from room temperature up to the boiling point of the solvent. Preferably the temperature employed is at least about 50° C. and is not substantially over about 100° C. During the reaction, agitation, although not necessary, is preferred as by stirring the reaction mixture.

Examples of the preparation of the 2-amino-5-chlorobenzoxazole in accordance with this embodiment are set forth below:

*Example III*

Sixty-one grams of 5-chloro-2-hydroxyphenylthiourea are mixed with 145 grams (0.65 mole) of yellow lead oxide and one liter of methanol. The mixture is refluxed with stirring for three hours. The lead sulfide which is formed and the excess lead oxide are removed by filtration an washed with methanol. The methanol solutions are combined, and distillation of the methanol under vacuum, leaves, as residue, crude 2-amino-5-chlorobenzoxazole. Recrystallization several times from benzene results in white crystals melting at 185–185.5° C.

The calculated analysis for $C_7H_5ClN_2O$ is C, 49.9; H, 3.0; Cl, 21.0 and N, 16.6; that found is C, 49.5; H, 3.2; Cl, 20.9 and N, 16.5.

An ultraviolet spectrum of a solution of 2 milligrams of the compound per 100 milliliters of methanol shows peaks at 244 and 285 mu.

The above compound is converted to a salt by adding to a solution thereof in methyl ethyl ketone a saturated solution of an equivalent of maleic acid in methyl ethyl ketone, and separating the resulting solid product by filtration. Recrystallization of the product from methyl ethyl ketone gives 2-amino-5-chlorobenzoxazole maleate melting at 159.5–160° C.

The calculated N content for $C_{11}H_9ClN_2O_5$ is 9.8; that found is 9.6.

*Example IV*

To a solution of 20 grams (0.1 mole) of 2-hydroxy-5-chlorophenylthiourea in 50 ml. of methanol is added a solution of 17 grams (0.1 mole) of cupric chloride dihydrate in 50 ml. of methanol. A brown precipitate results. Ammonium hydroxide (27 ml. of 28% solution, 0.2 mole) is then added, and the mixture is heated to boiling and filtered. The filtrate is poured into 500 ml. of water. The resulting precipitate is collected, dissolved in 25 ml. of acetone, and the resulting solution treated with activated charcoal. The addition of 50 ml. of benzene, evaporation to 35 ml. and cooling gives brown crystals melting at 178–182° C. Recrystallization of the crystals from benzene gives needles of 2-amino-5-chlorobenzoxazole melting at 185–186° C.

An ultraviolet spectrum of a solution containing 2 milligrams of the crystals per 100 milliliters of methanol shows peaks at 245 and 286 mu.

*Example V*

To a solution of 10 grams (0.05 mole) of 2-hydroxy-5-chlorophenylthiourea in 50 ml. of methanol is added a solution of 11 grams (0.04 mole) of ferric chloride hexahydrate in 50 ml. of methanol. The initial purple-red color changes in a few minutes to amber. After stirring for one half hour, the solution is treated with 16.5 ml. of 57% ammonium hydroxide solution (0.24 mole). A brown, flocculent precipitate of ferric sulfide appears. The mixture is then refluxed with stirring for one hour, cooled and centrifuged. The centrifugate is evaporated to dryness, and the residue is shaken with ether and water to separate the organic material from the ammonia chloride. The ether layer is extracted three times with 25 ml. portions of 1 N hydrochloric acid. The acid solution is then poured into excess ammonium hydroxide, and the resulting solid collected, washed with water and dried. This gives a light tan solid melting at 183–185° C. The material is then dissolved in 25 ml. of acetone and 50 ml. of benzene are added. After treatment of the solution with activated charcoal, the light yellow solution is evaporated to 25 ml. and cooled. The white crystals of 2-amino-5-chlorobenzoxazole which separate melt at 185–186° C.

The 5-chloro-2-hydroxyphenylthioureas employed in the above-described procedure may be readily prepared by reacting the appropriate 2-amino-4-chlorophenol with a thiocyanate, such as ammonium thiocyanate, in aqueous medium containing one equivalent acid. An example illustrating the preparation of 5-chloro-2-hydroxyphenylthiourea is set forth below:

*Example A*

To a solution of 106 grams (0.74 mole) of 2-amino-4-chlorophenol in 500 milliliters of water containing 69 ml. of concentrated hydrochloric acid (29.2 grams, 0.8 mole) are added 60.8 grams (0.8 mole) of ammonium thiocyanate. The solution is placed in an evaporating dish and heated on a steam bath for 5 hours. The solid which results is then removed from the concentrated solution by filtration, washed with a small amount of water and dried. The filtrate is placed in an evaporating dish and heated on a water bath for two hours. At the end of this time, the mixture is cooled, and the solid which precipitates out is removed by filtration. Both solid products are 5-chloro-2-hydroxyphenylthiourea melting at 157° C., and may be combined. The calculated N content for $C_7H_7ClN_2OS$ is 13.8; that found is 13.6.

Considerable modification is possible in the selection of the particular conditions, reactants and media as well as in the techniques followed without departing from the scope of the present invention.

I claim:

1. The method for the preparation of 2-amino-5-chloro-benzoxazole, which comprises heating 2-hydroxy-5-chlorophenylthiourea to remove hydrogen sulfide therefrom.

2. The method of claim 1 wherein a solution containing said 2-hydroxy-5-chlorophenylthiourea is heated.

3. The method of claim 2 wherein said solution is alkaline.

4. The method of claim 2 wherein the reaction takes place in the presence of a metal compound selected from the group consisting of oxides, hydroxides and salts of lead, copper, iron, nickel, cobalt, silver, mercury, uranium, tin and gold.

5. The method of claim 4 wherein the metal compound is lead oxide.

6. The method of claim 4 wherein the metal compound is cupric chloride.

7. The method of claim 4 wherein the metal compound is ferric chloride.

8. The method of claim 1 wherein said 2-hydroxy-5-chlorophenylthiourea is heated to at least 50° C.

9. The method of claim 3 wherein said 2-hydroxy-5-chlorophenylthiourea is heated to at least 50° C.

10. The method of claim 4 wherein said 2-hydroxy-5-chlorophenylthiourea is heated to at least 50° C.

References Cited in the file of this patent

FOREIGN PATENTS 669,402    Great Britain _____ Apr. 2, 1952